Patented June 4, 1929.

1,715,925

UNITED STATES PATENT OFFICE.

RALPH M. JACKSON, OF LA HABRA, CALIFORNIA, ASSIGNOR OF ONE-HALF TO CALIFORNIA CYANIDE COMPANY, A CORPORATION OF DELAWARE.

PROCESS FOR PEST CONTROL.

No Drawing.   Application filed July 15, 1925.  Serial No. 43,845.

My invention relates to the fumigation of trees for pest control, and more particularly to fumigation by a highly volatile gas introduced beneath a tent covering a tree.

It is the object of the invention to eliminate the laborious, inconvenient, and disagreeable work incident to the original pot method of fumigation, and also obtain increased insecticide efficiency over the present method of applying a dose of gas in one volume.

In the original pot method of fumigation, an insecticide gas was formed by fuming chemicals in a pot placed beneath a tree which was covered with a tent, it being found by experience that best results were obtained when the tents were left on the trees for approximately one hour.

By the pot method the gas was not released suddenly in one volume, but was maintained for a considerable length of time at a mean insecticide gas concentration by the continuous fuming of the chemicals. As a consequence there was no excessive leakage from the tents due to extremely high gas concentration, and the continuous fuming constantly replaced the relatively slow leakage of gas in order to maintain a mean insecticide concentration. Very satisfactory results were obtained by this process, since there was never such excessive concentration of the gas as would be liable to injure the trees or fruit under normal conditions, and the mean insecticide gas concentration was maintained for a sufficient length of time to effectively destroy pests on the trees.

It was only the inconvenience of the pot method that led to the adoption of the applicator method of fumigating, which consists of discharging a dose of insecticide gas in one volume beneath a tent covering a tree. The sudden full volume of gas is introduced beneath a tent from a mechanical applicator discharging a liquid concentrate previously manufactured from suitable chemicals. The dosage originally used in this method was based upon the dosage previously found efficient under the pot method, and the time of exposure was the same, but the insecticide efficiency frequently did not average nearly as high.

The subject has received considerable study, but entomologists and scientists have failed to account for this loss in efficiency, and the remedies proposed have proved unsatisfactory and inadequate. An increase in the dosage has accomplished slightly better results as an insecticide, but frequently with very harmful results to the trees and fruit.

The applicator method of fumigating has therefore proved superior to the pot method from the standpoint of operating convenience, but the loss of insecticide efficiency and the increased injury to trees and fruit has proved a serious detriment until the discovery of the causes, which has resulted in the present improved fumigating process.

By experiments and comparisons of the pot and applicator methods, I have determined that the superior efficiency of the pot method as an insecticide, results from maintaining a mean gas concentration for a relatively long time, without excessively high concentration at the beginning of the operation, or subsequent rapid decline below minimum insecticide efficiency. As a consequence the gas concentration is never sufficiently high under normal conditions to cause injury to the trees or fruit, but, on the other hand, the gas concentration remains above minimum insecticide efficiency for a sufficient length of time to complete the destruction of the pests.

I have also determined that the unsatisfactory results obtained by the applicator method are due to the high initial gas concentration resulting from the release of the dose in one volume. The proportion of gas leaking from a tent increases rapidly as the concentration of the gas is increased, and this is particularly true when the tents are dry and there is not an excess of humidity, conditions which unfortunately are otherwise most favorable for efficient fumigation, and as a consequence the initial high gas concentration under the applicator method rapidly leaks from the tents and quickly declines below minimum insecticide efficiency, so that an efficient insecticide concentration of the gas is not maintained for a sufficient length of time to effectively destroy the pests.

If the initial high gas concentration is increased by an increase in the dosage, a concentration above minimum insecticide efficiency is of course maintained for a somewhat longer time, but the increase in the period of insecticide efficiency is seriously curtailed by the rapid increase in the leakage of gas at the higher concentration. As a consequence if concentration at insecticide efficiency is to be maintained for a sufficient length of time to effectively destroy the pests, the initial concentration must be so high as to tend to destroy the trees and fruit.

Furthermore I have discovered that the initial high concentration of gas resulting from the applicator method, is no more efficient as an insecticide than a mean concentration, efficiency in either case being determined solely by the maintaining of a concentration which is above minimum insecticide efficiency for a sufficient length of time to complete the destruction of the pests.

As a result of my discoveries I have invented a process of fumigation combining the advantages of the pot and applicator methods and without the disadvantages thereof. The insecticide gas is discharged under a tent from an applicator, thereby eliminating the inconveniences of the pot method, and the gas is applied in such doses and at such intervals of time as to maintain a gas concentration of mean insecticide efficiency for a sufficient period of time to effectively destroy the pests, and without an excessive initial gas concentration.

The improved process which thus provides maximum insecticide efficiency, is also adapted for use without an increase in the consumption of fumigating material, and with no loss of time or other waste.

Referring to my process in detail, a dose of the fumigant which may be approximately equal to that heretofore discharged under a tent in one volume, is divided into a plurality of doses which are successively discharged under a tent at predetermined intervals of time. The part of the dose which is initially applied, hereinafter referred to as the first shot, is sufficient to produce a gas concentration of mean insecticide efficiency, but not sufficiently high as to injure the trees or fruit or cause excessive leakage from the tent. There is of course some leakage of the gas so that the gas concentration is gradually reduced, but the initial concentration being of mean insecticide efficiency, it will be some time before the gas concentration declines to minimum insecticide efficiency, and before this point is reached another part of the full dose, hereinafter referred to as the second shot, is discharged beneath the tent. This second shot is for the purpose of again establishing approximately the original gas concentration, so that as the gas again gradually escapes, mean insecticide concentration will be again maintained for an appreciable length of time, without excessive initial concentration or an excessively rapid decline in gas concentration.

From experiments with this method I have determined that by not employing an excessive initial gas concentration, leakage of gas from the tents may be reduced to approximately 33⅓% for each ten minutes of exposure, so that a continuous gas concentration of mean insecticide efficiency may be maintained for a sufficient length of time to effectively destroy pests, by dividing the original dose of fumigant into two shots and applying the same at approximately twenty minute intervals, the first shot being from 30% to 50% greater than the second shot, since at the time the latter is applied, there is still a gas concentration under the tent in excess of minimum insecticide efficiency, and the purpose of the second shot is simply to reestablish approximately the original concentration.

Application of a full dose in two shots as thus described, also permits of practical operation in an orchard without waste of time and at maximum operating efficiency, when working with approximately sixty tents as is the usual practice.

A supply station is preferably located near the center of the string of approximately sixty trees covered with tents, and the operators work from this station and return to it when each half of the string of trees has been fumigated.

Two applicators of desired mechanical construction and the accompanying operators are employed for making the first and second shots respectively. The first shooter, following the taper and tent pullers, starts the work from the supply station and successively applies the first shot to the trees of one-half of the string. The normal full dosage having been previously determined in accordance with the condition of the trees and climatic conditions as is the usual practice, and the proper ratio between the first and second shots having also been decided, the dosage applied to each tree by the first shot, is computed by the measurements of the respective trees with relation to the basic dosage, and the first shooter charts the dosage on a first chart as he progresses to the end of the string. He then returns to the supply station and turns over the first chart to the second shooter, the elapsed time closely approximating the desired interval between the two shots. The second shooter then applies the second shot to succeeding trees of the first half of the string, basing the dosage upon the desired ratio between the second shot and the applied dosage of the first shot as indicated upon the chart which he has received.

When he reaches the end of the string the second shooter returns to the supply station, and in the meantime the first shooter has applied the first shot to the other half of the string of trees and has returned to the supply station where he turns over to the second shooter a second chart showing the dosage which he has applied to the second half of the string of trees. The second shooter then applies the second shot to the second half of the string, using the second chart to determine the dosage, and while the second shooter is finishing the work on the second half of the string of trees, the first shooter has moved on and completed the first shot on one-half of the trees of the next string. The work thus progresses without delay, and with the succeeding shots applied at such an interval as to maintain a gas concentration in excess of minimum insecticide efficiency for a comparatively long period of time.

I am aware that so-called "double shooting" has been heretofore tried, under which method a full dosage is applied in one volume, and after exposure for the normal period employed for a full shot, the operation is repeated. As a consequence the initial gas concentration is excessive, and deteriorates below minimum insecticide efficiency long before the second full shot is applied, thereby allowing the pests to recover before subjecting the same to the second dose. The second shot therefore does not continue a gas concentration of unbroken mean insecticide efficiency as established by the first shot.

By my improved method, on the other hand, only one full dose is necessary, and the gas concentration is never excessive but continues for a relatively long time at mean insecticide efficiency so as to offer no opportunity for recovery of the pests.

I claim:

1. The process of treating trees with a volatile fumigant for pest control which consists of making a plurality of doses of the fumigant at such intervals of time bearing such relation to the relative strength of the respective applications as to maintain a continuous gas concentration above minimum insecticide efficiency throughout and overlapping the intervals of time between the successive applications of the fumigant and for a sufficient length of time to effectively destroy the pests.

2. The process of treating trees with a volatile fumigant for pest control which consists of making such an application of the fumigant as to produce a gas concentration which is below tree injuring concentration but is adapted to maintain a gas concentration above minimum insecticide efficiency for an appreciable period, and making such a second application of the fumigant just prior to the end of said period as to re-establish gas concentration which is below tree injuring concentration and continue gas concentration above minimum insecticide efficiency for another appreciable period.

3. The process of treating trees with a volatile fumigant for pest control which consists of making such an application of the fumigant as to produce a gas concentration which is below tree injuring concentration but is adapted to maintain a gas concentration above minimum insecticide efficiency for approximately one-half the period of exposure necessary for effective destruction of pests, and making such a second application of the fumigant before the expiration of said first half of the period of exposure, as to reestablish approximately the original gas concentration and continue gas concentration in excess of minimum insecticide efficiency for the remainder of the period necessary for effective pest destruction.

4. The process of treating trees with a volatile fumigant for pest control which consists of making initial application of the fumigant to succeeding trees of a string of trees covered with tents, and after reaching the end of the string immediately making second applications of the fumigant to the succeeding trees, the number of trees treated in the string being such as to provide a time interval between the respective applications which bears such relation to the relative strength of the applications that said applications will cooperate to maintain a continuous gas concentration which is never of such excessive concentration as to injure the trees but which is above minimum insecticide efficiency throughout and beyond said time interval and for a sufficient length of time to effectively destroy pests.

5. The process of treating trees with a volatile fumigant for pest control which consists of successively making an initial application of the fumigant to the respective trees in accordance with the measurements thereof, charting the initial application applied to the respective trees, and after making the initial application to the respective trees immediately making a second application of the fumigant to said successive trees, said second application being computed as a proportional part of the initial application indicated by said charting, the respective applications and the elapsed time between the making thereof being such as to maintain a continuous gas concentration which is never of such excessive concentration as to injure the trees but which is above minimum insecticide efficiency throughout and beyond said elapsed time and for a sufficient length of time to effectively destroy pests.

6. The process of treating trees with a volatile fumigant for pest control which consists of starting from the center of a string of trees covered with tents and making an initial application of fumigant to succeeding trees of one-half of the string, then immediately starting from the center of the string and making the initial application to succeeding trees of the other half of the string, and at the same time starting from the center of the string and making a second application of the fumigant to succeeding trees of the first half of the string, and then immediately starting from the center of the string and making the second application of the fumigant to succeeding trees of the second half of the string, the relative applications bearing such relation to the elapsed time between the making thereof as to maintain continuous gas concentration which is never of such excessive concentration as to injure the trees but which is in excess of minimum insecticide efficiency throughout and beyond said elapsed time and for a sufficient length of time to effectively destroy pests.

In testimony whereof I hereunto affix my signature.

RAL